Oct. 1, 1963  
A. V. WEASLER  
LUBRICATION OF THE RELATIVELY EXTENSIBLE  
PARTS OF A TELESCOPIC SHAFT  
Filed April 18, 1961  
3,105,370

INVENTOR.  
ANTHONY V. WEASLER  
BY  
Wheeler, Wheeler, Wheeler  
ATTORNEYS.

United States Patent Office 3,105,370
Patented Oct. 1, 1963

3,105,370
LUBRICATION OF THE RELATIVELY EXTENSIBLE PARTS OF A TELESCOPIC SHAFT
Anthony V. Weasler, 693 Ridge Road, West Bend, Wis.
Filed Apr. 18, 1961, Ser. No. 103,831
5 Claims. (Cl. 64—23)

This invention relates to lubrication of the relatively extensible parts of a telescopic shaft.

Conventionally telescopic shafts include an inner shaft of square or other non-circular cross section and an outer shaft which has a bearing insert complementary to that of the inner shaft and reciprocable thereon, the mating non-circular cross sections of the inner shaft and insert serving to transmit rotative motion between the inner and outer shaft sections in all positions of relative axial extension thereof.

In the past, the bearing surfaces have been subject to excessive wear due to inadequate lubrication. In a device of this character, there may be hazard in the use of standard lubricating equipment. The present invention contemplates the provision of a reservoir of lubricant within the outer shaft member, such reservoir being provided by making the outer shaft to comprise a sleeve spaced from the inner shaft and with which are connected axially spaced component bearing inserts engaged with the inner shaft member. A pressure grease fitting is pocketed in an indentation in this sleeve so that it does not project sufficiently to be hazardous.

Figure 1:
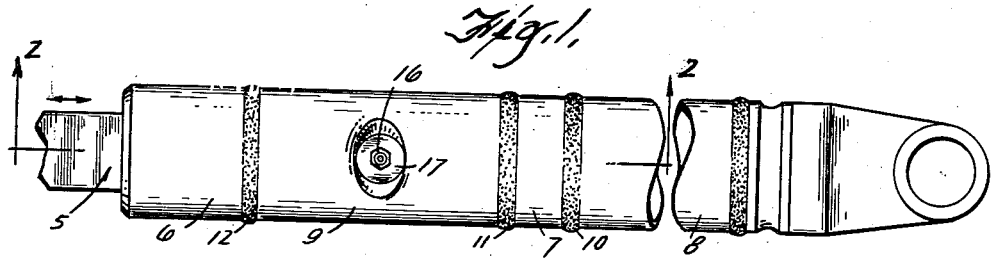
FIG. 1 is a fragmentary elevation of a shaft embodying the invention.
Figure 2:
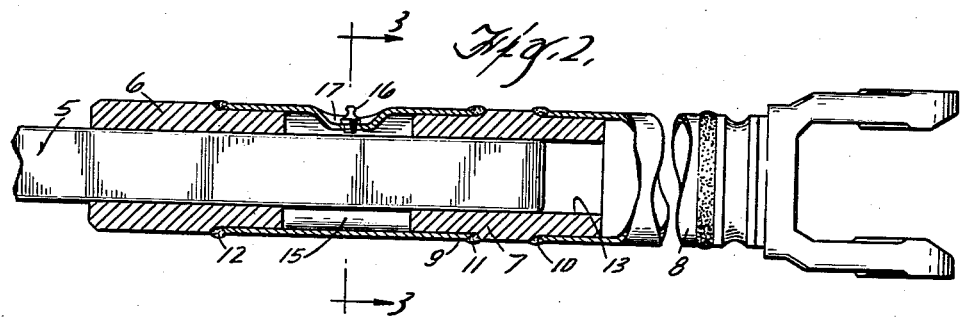
FIG. 2 is a fragmentary plan view with portions broken away on the section indicated at 2—2 in FIG. 1.
Figure 3:
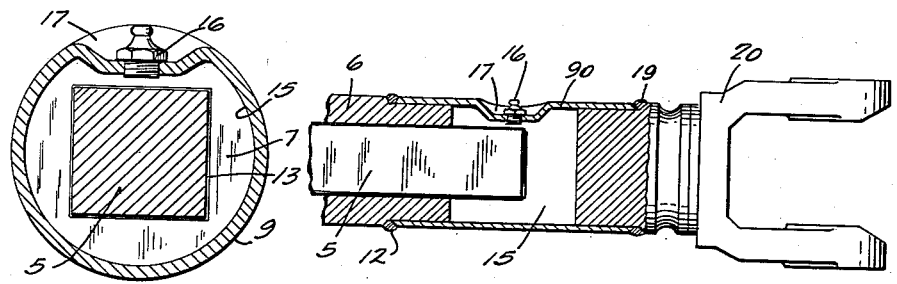
FIG. 3 is an enlarged detail view taken in transverse section on the line 3—3 of FIG. 2.

The inner shaft of non-circular cross section is shown at 5. In practice, the cross section is square, as shown. This shaft is reciprocable in one or more bearing members 6 and 7 which are welded within and part of a tubular outer shaft 8. The bearing members 6, 7 are axially spaced and the bearing member 7 may, if desired, connect the outer shaft 8 to the extension portion 9 thereof as shown. The weld 10 attaches the tubular shaft 8 to the bearing member 7. Weld 11 connects the bearing member 7 to the tubular shaft extension 9 and weld 12 connects tubular shaft extension 9 to bearing member 6, whereby the parts so connected are all parts of the outer extensible shaft to provide for axial extension. The inner bearing surfaces 13 of the bearing members 6 and 7 are of non-circular cross section complementary to that of the inner shaft 5, as is shown in FIG. 3.

In accordance with the present invention, the bearing members 6 and 7, which would conventionally be a single bearing member, are spaced to provide a chamber at 15 for lubricant which may be introduced through the fitting 16. The wall of the shaft section 9 is indented at 17 to receive the fitting 16 which is screwthreaded or otherwise fixed thereto. The indentation is as deep as can be accommodated without contact of fitting 16 with the inner shaft section 5. This locates almost all of the fitting 16 within the indentation, as clearly appears in FIG. 3.

In practice, the chamber 15 will be substantially filled with lubricant of semi-solid type and this lubricant will have access to all bearing surfaces of the inner shaft 5 and the complementary bearing members 6 and 7. In the course of axial reciprocation between the parts, the lubricant will make its way into the bearing members 6 and 7 to assure adequate lubrication throughout.

Figure 4:
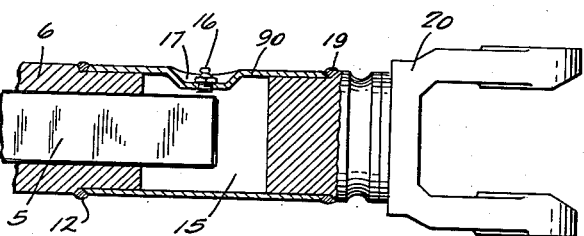
FIG. 4 and FIG. 5 are views similar to FIG. 2 showing modified embodiments of the invention.

FIG. 4 shows a construction in which bearing element 7 is omitted and the outer shaft sleeve 90 is welded at 19 directly to the universal or other coupling element 20. This arrangement is useful if the bearing is to be close to the coupling.

Figure 5:
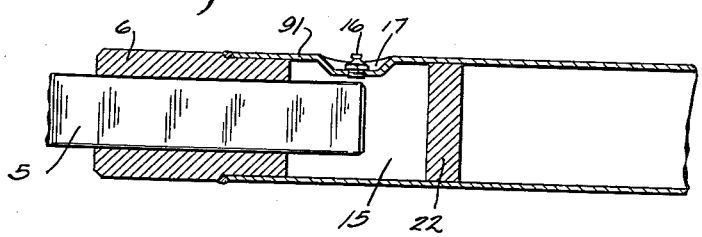

FIG. 5 shows the use of a single bearing element 6 remote from any coupling, the tubular outer shaft 91 being elongated and the grease chamber 15 reduced to reasonable size by a plug element 22 of wood or metal secured by press fit or otherwise in the tubular shaft 91.

I claim:

1. In an extensible shaft, the combination with an inner shaft member having a bearing surface of non-circular cross section, of an outer shaft member including a sleeve, a first bearing element connected to the sleeve and having surfaces complementary to those of the inner shaft member and reciprocably engaged therewith, a second bearing element fixed to the sleeve in spaced relation to the first bearing element and having surfaces complementary to those of the inner shaft member and reciprocably engaged therewith, the space enclosed by the sleeve and said elements providing a lubricant chamber, and means communicating with said chamber through that portion of the sleeve about said space for introducing lubricant into said chamber, the sleeve being indented into said space and said means comprising a grease fitting connected with said sleeve in its most indented portion, the depth of the indentation being sufficient so that the fitting is at least substantially recessed below the sleeve periphery within the indentation.

2. The combination of an outer elongated tubular shaft member having a recessed portion intermediate its ends, an inner shaft member having a bearing surface of non-circular cross-section, a first bearing element having a bearing surface complementary to the bearing surface of said inner shaft member, said first bearing surface being fixed to and within said outer tubular shaft member in spaced relation to, and on one side of, said recessed portion and being reciprocably engaged with said inner shaft member, a second element fixed to and within said outer tubular shaft in transverse relation thereto and in spaced relation to and on the other side of said recessed portion, thereby defining with said first bearing element and said outer shaft member a chamber in which said inner shaft member is movable, and a grease fitting mounted on said recessed portion and adapted to supply said chamber with lubricant, said grease fitting and said recessed portion being proportioned so that the outermost end of said grease fitting terminates substantially within the transverse outline of the portions of said outer tubular shaft member disposed axially adjacent to said recessed portion.

3. The device of claim 2 in which the element fixed to the sleeve constitutes a closure spaced from the inner shaft member.

4. The device of claim 3 in which the closure constitutes a coupling element at the end of the outer shaft member.

5. The device of claim 3 in which the closure constitutes a plug beyond which the outer shaft member extends.

References Cited in the file of this patent

UNITED STATES PATENTS

| | | |
|---|---|---|
| 1,612,322 | Spicer | Dec. 28, 1926 |
| 2,072,090 | Anderson | Mar. 2, 1937 |
| 2,116,290 | Spicer | May 3, 1938 |
| 2,567,127 | Shoffner | Sept. 4, 1951 |

FOREIGN PATENTS

| | | |
|---|---|---|
| 1,195,734 | France | May 19, 1959 |